US005635232A

United States Patent [19]

Wallace

[11] Patent Number: 5,635,232
[45] Date of Patent: Jun. 3, 1997

[54] SAFE METHOD AND APPARATUS FOR PRESERVING AND RE-CARBONATING BEVERAGES

[75] Inventor: Ronald E. Wallace, Seattle, Wash.

[73] Assignee: Perlage Systems, Inc., Seattle, Wash.

[21] Appl. No.: 344,101

[22] Filed: Nov. 23, 1994

[51] Int. Cl.$^6$ .................. C12G 1/06; A23L 2/54; B65D 81/20
[52] U.S. Cl. .................. 426/397; 141/3; 141/18; 261/DIG. 7; 99/323.1; 426/398; 426/477
[58] Field of Search .................. 426/477, 397, 426/398, 395, 394; 141/3, 4, 18, 21; 261/DIG. 7; 53/432; 215/10, 228, 12.1, 12.2, 395; 220/740, 737, 411, 413; 99/323.1

[56] References Cited

U.S. PATENT DOCUMENTS

| | | | |
|---|---|---|---|
| 659,895 | 10/1900 | Peters | 215/12.1 |
| 860,316 | 7/1907 | Nash | 215/12.1 |
| 1,966,854 | 7/1934 | Eskilson | 261/DIG. 7 |
| 2,051,933 | 8/1936 | Andvig | 261/DIG. 7 |
| 2,172,035 | 9/1939 | Roth | 261/DIG. 7 |
| 2,591,990 | 4/1952 | Wisdom | 261/DIG. 7 |
| 2,805,846 | 9/1957 | Dewan | 261/DIG. 7 |
| 3,186,599 | 6/1965 | Levinson et al. | 222/82 |
| 3,976,221 | 8/1976 | Martin et al. | 222/61 |
| 3,986,535 | 10/1976 | Meckstroth | 261/DIG. 7 |
| 4,342,710 | 8/1982 | Adolfsson et al. | 426/477 |
| 4,457,877 | 7/1984 | Love et al. | 261/DIG. 7 |
| 4,510,769 | 4/1985 | McClellan | 215/13.1 |
| 4,665,940 | 5/1987 | Jacobson | 137/212 |
| 4,691,842 | 9/1987 | Foures | 222/1 |
| 4,706,847 | 11/1987 | Sankey et al. | 222/1 |
| 4,723,670 | 2/1988 | Robinson et al. | 215/228 |
| 4,785,977 | 11/1988 | Ball | 222/399 |
| 4,940,212 | 7/1990 | Burton | 261/DIG. 7 |
| 4,982,879 | 1/1991 | Corrado et al. | 222/400.7 |
| 5,031,785 | 7/1991 | Lemme | 215/228 |
| 5,139,179 | 8/1992 | Cecil | 222/399 |
| 5,180,081 | 1/1993 | McCann | 222/23 |
| 5,329,975 | 7/1994 | Heitel | 215/228 |

FOREIGN PATENT DOCUMENTS

2133302 7/1984 United Kingdom ............ 261/DIG. 7

*Primary Examiner*—Steven Weinstein
*Attorney, Agent, or Firm*—Seed and Berry LLP

[57] ABSTRACT

An enclosure apparatus for enclosing a pressurized container within a non-defeatable safety structure, and for pressurizing the container with pressurized carbon dioxide gas to preserve and recarbonate beverages within the container. In a preferred embodiment, the apparatus includes a rigid body that receives a previously opened container having a beverage therein. A top member is releasably connected to an upper portion of the rigid body, and the top member includes an alignment guide that coaxially aligns the top of the container with the top member. An aperture extends through the top member and communicates with the opening of the container and a seal around the aperture is positioned to engage the top portion of the container and to form a gas-tight seal. A valve, which is connectable to a high-pressure carbon dioxide gas source, is located within the aperture and allows pressurized carbon dioxide gas to pass into the container so as to pressurize the container to a selected pressure. A bottom member having an integral alignment guide is attached to the lower portion of the rigid body and is adapted to support and align the bottom portion of the container within the rigid body. The bottom member includes a quick release mechanism that engages the rigid body and allows the bottom portion to be quickly and easily removed from the rigid body, thereby allowing the container to be easily removed from the enclosure apparatus.

31 Claims, 3 Drawing Sheets

SAFE METHOD AND APPARATUS FOR PRESERVING AND RE-CARBONATING BEVERAGES

TECHNICAL FIELD

The present invention relates to an apparatus for preserving carbonated beverages and, more particularly, to an apparatus for repressurizing a container with a beverage therein and carbonating or recarbonating the beverage.

BACKGROUND OF THE INVENTION

Carbonated beverages lose effervescence, and eventually go "flat," after their containers have been opened. For a sparkling wine, such as champagne, a noticeable decrease in quality can take place in a matter of hours.

This phenomenon strongly influences the manner in which sparkling wines are marketed, sold, and consumed. A typical consumer, for example, is unlikely to open a bottle of sparkling wine to have just one glass, knowing that the unused portion will soon go to waste. Indeed, this is why champagne is traditionally regarded as a beverage for special occasions, where waste is of little concern.

Waste is of great concern, however, to restaurants. It is not uncommon for restaurants that serve sparkling wines by the glass to discard several thousand dollars of product per year, and that amount grows with the number and cost of the brands kept available for by-the-glass sales. Consequently, while many restaurants serve an interesting variety of still (i.e., uncarbonated) wines by the glass, relatively few serve more than a single variety of inexpensive sparkling wine by the glass. This partially explains why the level of connoisseurship, and the level of sales, for sparkling wines is lower than for still wines.

There is a significant body of work directed toward the preservation of opened champagne bottles, as well as some persistent myths. One of the most common myths holds that a silver spoon placed handle-first in the neck of an open bottle will maintain the carbonation of the beverage within. This method is completely without foundation. A method with some merit is the commonly used spring-loaded pressure cap. This passive device is designed to hold escaping carbon dioxide gas within the confines of the bottle, until the pressure in the head space (i.e., the enclosed volume above the liquid) is sufficient to prevent further net escape of gas from the beverage. The flaw in this method is that the gas in the head space comes at the expense of dissolved gas in the liquid; hence, the larger the head space, the more volume there is to fill, and the more gas must leave solution. Furthermore, each time the cap is removed, the process starts over again, further depleting the dissolved carbon dioxide in the beverage.

There are several devices available that attempt to preserve sparkling wines, or other carbonated beverages, by repressurizing the opened container. For example, U.S. Pat. No. 4,273,670 to Robinson et al. and U.S. Pat. No. 5,031,785 to Lemme teach an apparatus that forms a seal over the opening of a bottle and repressurizes it by pumping air into the head space. By adding a pressurized gas, these devices appear at first glance to address the shortcoming of the passive cap described above.

However, these devices turn out to be even worse than the passive cap at what they purport to do. First, air contains oxygen gas, which can rapidly oxidize wine, and excessive oxidation will convert wine into vinegar. Second, pressurized air cannot, even in principle, be used to keep carbon dioxide in solution. The reason has to do with the nature of the gas-liquid equilibrium process. A gas will dissolve into a liquid, or evolve out of a liquid, until a characteristic equilibrium concentration of dissolved gas is reached, as determined by the partial pressure of that gas in the head space and the temperature of the liquid. These processes of absorption and evolution occurs simultaneously and independently of one another. At equilibrium, the two processes exactly balance, such that the rate of absorption just equals the rate of evolution, and the concentration of dissolved gas remains constant.

In other words, carbon dioxide pressure in the head space of a beverage does not, and cannot, prevent carbon dioxide from leaving solution, but rather balances the efflux by creating an equal rate of absorption. Pressurized air cannot be substituted in this process. The introduction of pressurized air to the head space of a carbonated beverage will increase the concentration of nitrogen and oxygen in the beverage, but will have no effect whatever on the equilibrium concentration of carbon dioxide. It is true that macroscopic bubbles of carbon dioxide can be suppressed by applying pressure to the surface of the liquid with air or any other gas, or even by some mechanical means. But the suppression of macroscopic bubbles alone merely slows the rate at which equilibrium is reached. The equilibrium concentration for each gas present is still determined solely by the partial pressure of that particular gas in the head space, and carbon dioxide gas will continue to evolve out of solution until equilibrium is reached even if there are no visible bubbles.

A further shortcoming of devices such as those described in Robinson et al. and Lemme is that they provide no safety feature upon an inadvertent rupture of the pressurized container. An unprotected glass bottle at high pressure can be very dangerous, and the danger increases as the level of liquid decreases: the lesser the volume of the beverage, the greater the volume of the head space, and hence the greater the stored energy of the compressed gas in the head space. While a bottle of unopened sparkling wine is fairly safe, a nearly empty repressurized bottle is a significant hazard.

Other systems, such as those disclosed in U.S. Pat. No. 4,691,842 to Foures, U.S. Pat No. 4,706,847 to Sanke et al., U.S. Pat. No. 5,139,179 to Cecil, U.S. Pat. No. 4,982,879 to Corrado et al., U.S. Pat. No. 5,108,081 to McCann, and U.S. Pat. No. 3,976,221 to Martin et al. teach adding low pressure gases to an open container with a beverage therein, such that the beverage is forced out of the container through a dispenser device. Foures in particular teaches the addition of low-pressure nitrogen to preserve and dispense uncarbonated wines from the original container. However, such devices will not work for highly carbonated beverages like sparkling wines. The reason is that sparkling wines, which are carbonated to about 90 psi, are highly unstable when not held at this elevated pressure. This instability is observable in the vigorous gushing of a carelessly handled bottle of open champagne. Any roughness or debris in the liquid pathway of the dispenser, or any turbulence in the liquid caused by the dispensing process, will cause vigorous foaming. This results in the sparkling wine going flat even as it is being dispensed. Using higher pressures, such as would be required to properly maintain the carbonation of the sparkling wine over time, results in an even more turbulent delivery process, more violent foaming, and an immediate loss of carbonation.

Even if such systems could be made to work for sparkling wines, they would suffer a serious flaw. The established traditions of champagne service call for the presentation of the bottle to the customer, and any device that renders the presentation process difficult, or interferes with the aesthetics of the presentation, is likely to be met with consumer resistance.

SUMMARY OF THE INVENTION

The present invention is directed toward an apparatus that allows a beverage to be repressurized in its original container. In a preferred embodiment the apparatus provides a safe, non-defeatable rigid enclosure that surrounds the original container and that allows high-pressure carbon dioxide gas to be distributed into the container in order to recarbonate the beverage and to prevent the concentration of dissolved carbon dioxide in the beverage from decreasing. The preferred apparatus substantially contains the container therein in the event the container fails under high pressure. The apparatus also allows the original container to be removed, after the elevated pressure within the container has been released, so the original container with the carbonated beverage therein can be presented and displayed to, for example, a potential customer or the like. The original container can then be returned to the rigid safety enclosure and repressurized to recarbonate and preserve the beverage.

In the preferred embodiment, the apparatus includes a rigid body that defines an interior area shaped to receive and removably contain the container. A top member is connected to an upper portion of the rigid body, and a bottom member is connected to a lower portion of the rigid body. The rigid body, the top member, and the bottom member provide the safety enclosure that surrounds the container when the container and beverage are pressurized. The top member includes an aperture that communicates with an opening in the container, and a seal that is attached to the top member around the aperture. The seal sealably engages the container around its opening to form a gas-tight seal. A one-way valve is positioned within the aperture, and the valve is removably connectable to a source of pressurized carbon dioxide gas. The aperture and the valve allow the pressurized carbon dioxide gas to pass through the top member and into the container, thereby pressurizing the container and beverage. The valve also blocks the carbon dioxide gas from flowing out of the container through the aperture.

In one embodiment of the invention, the top member is removably attached to the rigid body. As the top member is being removed, the seal is disengaged from the container and the pressurized carbon dioxide gas is released from within the container. After the top member is removed from the rigid body, the top of the container is exposed, whereby the beverage may be poured out of the container without interference from the rigid body. The rigid body includes a pressure release device that maintains the pressure within its interior area at approximately atmospheric pressure.

The bottom member of the preferred embodiment is removably attached to the rigid body, and the bottom member is constructed to be quickly separated from the rigid body to expose the container, such that the container may be completely removed from the apparatus. The position of the bottom member relative to the rigid body is adjustable in order to accommodate different size containers within the rigid body. Accordingly, the removable bottom member provides a simple adjustable device that allows for easy and quick access to the container, such as a champagne bottle, so that it may be presented to a customer or the like.

The invention enables the container to be pressurized with carbon dioxide gas to the equilibrium pressure that was present in the container before it was originally opened, such that the amount of carbon dioxide gas that evolved out of solution while the container was open will dissolve into the beverage and will recarbonate the beverage, thereby preserving the beverage's original character. Thus, one embodiment of the present invention preserves and recarbonates sparkling wine in its own bottle, without interfering with the established traditions of sparkling wine service and connoisseurship. The present invention further provides a safe, non-defeatable enclosure that will contain all of the container within the rigid body's interior area, in the event that the container should fail while under high pressure.

DETAILED DESCRIPTION OF THE INVENTION

Figure 1:
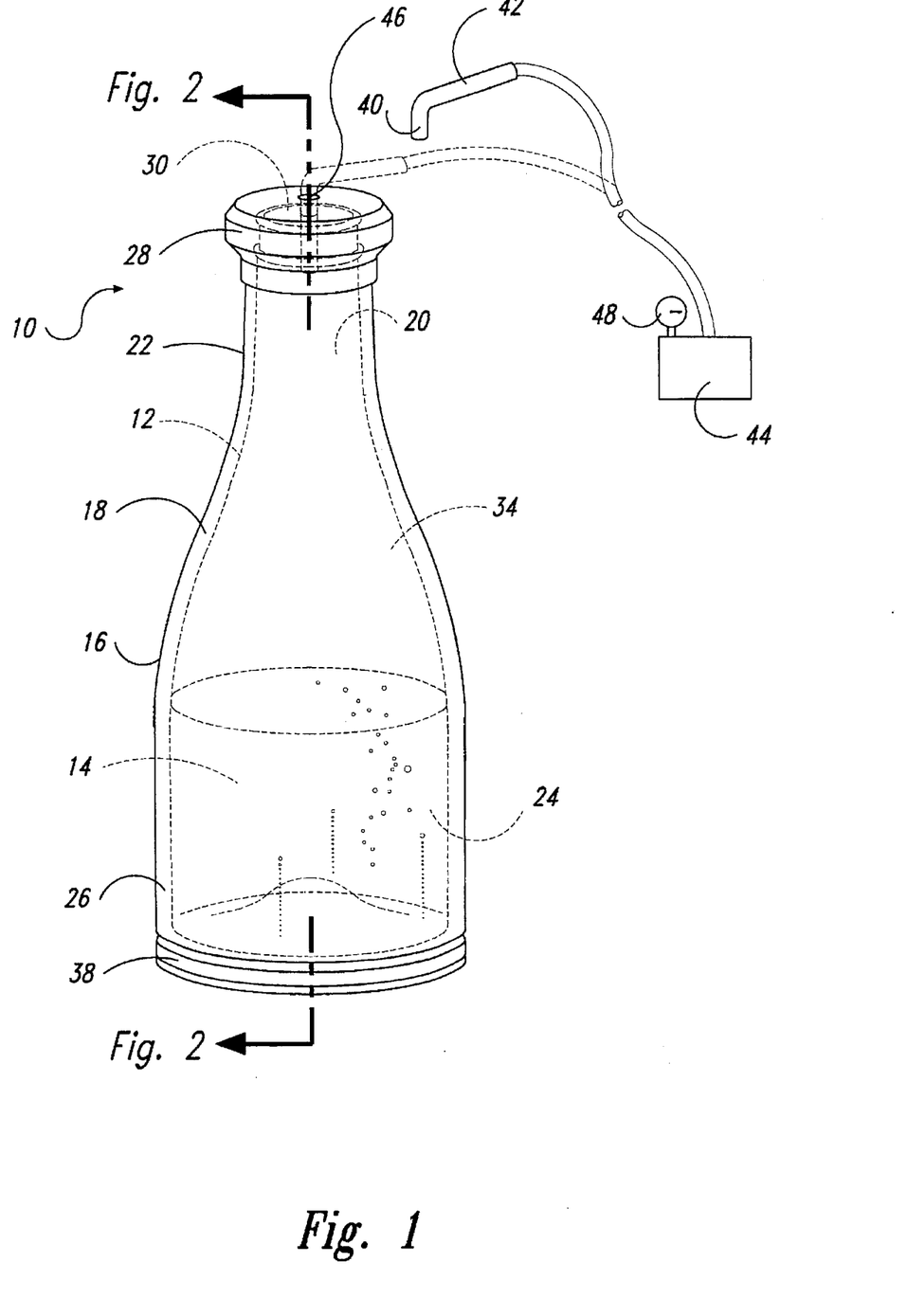
FIG. 1 is an isometric view of the safety enclosure and carbonation apparatus of a preferred embodiment of the present invention with a champagne bottle and champagne shown in hidden lines, and a pressurized gas source with a dispenser shown in solid lines removed from the apparatus and shown in phantom lines engaging the apparatus.

A safety enclosure and carbonation apparatus 10 in accordance with a preferred embodiment of the present invention is illustrated in FIG. 1 surrounding and completely containing a previously opened champagne bottle 12 that is partially filled with champagne 14. Although the embodiment of the present invention described herein and illustrated in the figures is used to contain and repressurize a champagne bottle and champagne, the apparatus 10 can be used with other containers that contain other beverages. The apparatus 10 includes a rigid body 16, a top member 28, and a bottom member 38 that surround and fully enclose the champagne bottle 12 in a non-defeatable enclosure. Thus, if for some reason the champagne bottle 12 were to fail while under high pressure, the apparatus 10 will completely retain fragments of the champagne bottle 12, preventing any glass particles from injuring persons in the vicinity of the failing bottle. The apparatus 10 also protects the bottle 12 from accidental impacts, making failure extremely unlikely.

The rigid body 16 defines an interior area 18 that is shaped and sized to receive and contain the champagne bottle 12. When the champagne bottle 12 is positioned within the interior area 18, the rigid body 16 surrounds substantially all of the champagne bottle, with an upper portion 22 of the rigid body 16 surrounding a top portion 20 of the bottle, and a lower portion 26 of the rigid body surrounding a bottom portion 24 of the bottle. The top member 28 is removably connected to the upper portion 22 of the rigid body, and sealably engages the top portion 20 of the champagne bottle 12. The bottom member 38 is removably attached to the lower portion 26 of the rigid body 16 opposite the top member 28 to support the bottom of the champagne bottle 12.

The champagne bottle 12 within the apparatus 10 is repressurized with carbon dioxide gas by directing carbon dioxide gas into the bottle through an aperture 46 that extends through the top member 28. The aperture 46 communicates with the bottle's opening 30 and with the bottle's head space 34 above the champagne 14. The aperture 46 removably receives a dispensing end 40 of a dispenser 42 that is connected to a pressurized carbon dioxide gas source 44. The aperture 46 securely receives and properly aligns the dispensing end 40 therein such that the pressurized carbon dioxide gas is quickly, quietly, and efficiently passed through the top member 28 and into the bottle's head space 34, thereby pressurizing the champagne bottle with the high-pressure carbon dioxide.

The pressurized gas source 44 has a regulator 48 that controls the amount of carbon dioxide gas flowing into the head space 34 whereby the champagne bottle may be pressurized to a selected level. For example, the champagne's equilibrium pressure and the pressure that was in the champagne bottle's head space 34 before being opened was approximately 90 psi. The opened champagne bottle 12 within the apparatus 10 is repressurized to approximately 90 psi (approximating the original pressure) so additional carbon dioxide gas will dissolve into the champagne 14, thereby recarbonating the champagne to its original level. Therefore, the apparatus 10 allows the high-pressure carbon dioxide gas to be forced into the champagne bottle 12 so as to recarbonate the champagne 14 or any other beverage that is within the bottle.

Figure 2:
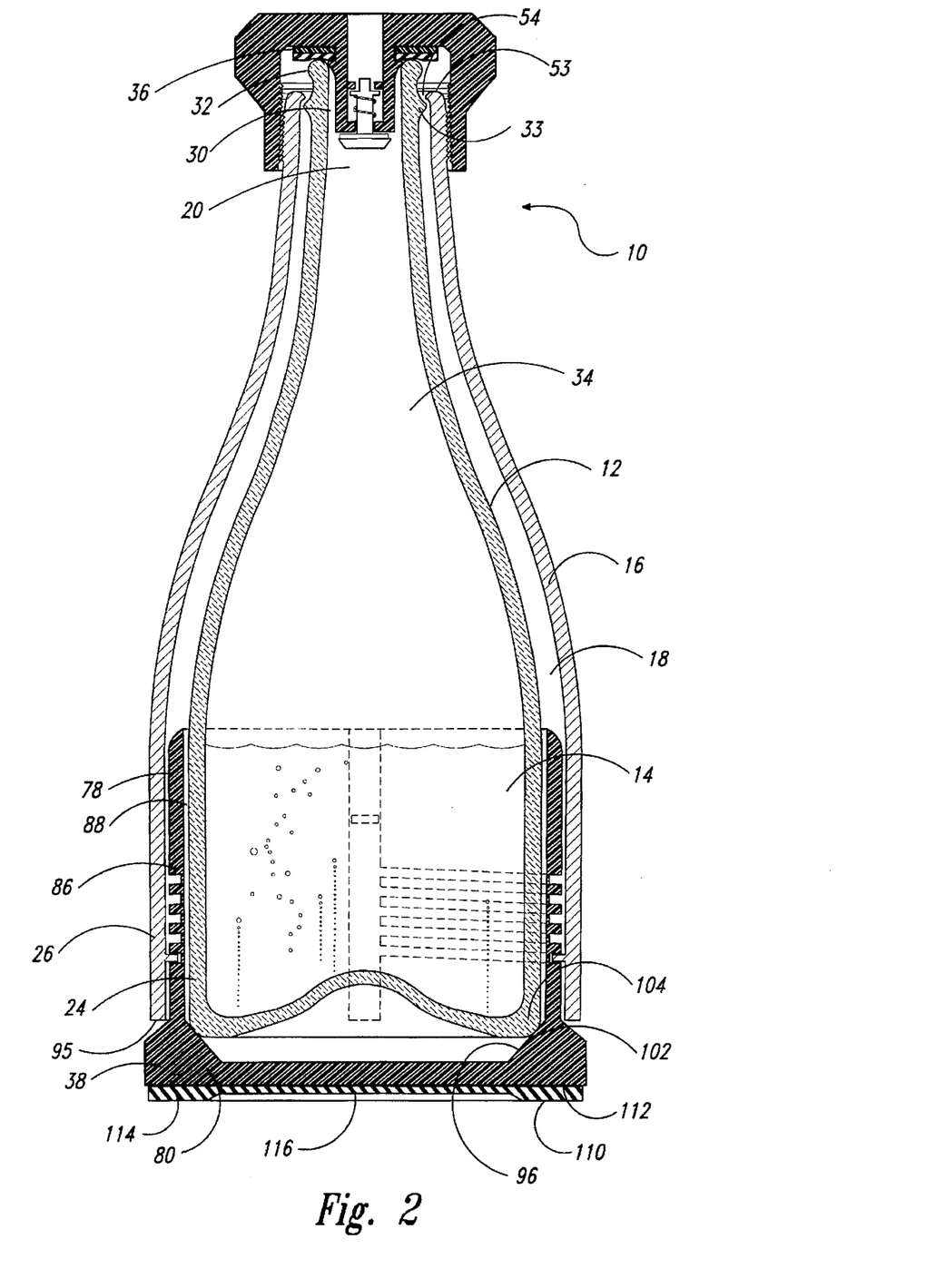
FIG. 2 is an enlarged cross-sectional view of FIG. 1 taken substantially along line 2—2.

As best seen in FIG. 2, the rigid body 16 has a shape that substantially corresponds to the champagne bottle's shape so relative movement of the champagne bottle within the interior area 18 is minimized, and so the rigid body holds the champagne bottle within the interior area when, for example, the apparatus 10 is tilted and champagne 14 is poured out of the bottle. Minimizing the relative movement of the champagne bottle 12 substantially reduces the risk of rupturing or damaging the champagne bottle in the event that the apparatus and pressurized champagne bottle are jostled about or even dropped.

The rigid body 16 in an alternate embodiment, not illustrated, includes a window portion that allows a user to view a label on the champagne bottle 12 without having to remove the champagne bottle from the apparatus 10. In another alternate embodiment, not illustrated, the rigid body 16 includes a writing area on which information can be written, for example, to identify champagne contained within the rigid body. The writing area is easily erasable or clearable so the apparatus is usable with a wide range of beverages and containers. The rigid body 16 of the illustrated embodiment illustrated in FIG. 1 is a non-defeatable rigid enclosure constructed of spin-molded stainless steel having a strength that is sufficient to completely contain an exploding champagne bottle if the champagne bottle should fail under high pressure. Although the preferred rigid body 16 is stainless steel, other sufficiently strong materials, such as injection molded plastic or the like, could be used. The rigid body 16 may also be shaped and sized to correspond to the shape and size of other containers.

The champagne bottle 12 is a conventional bottle having an annular upper lip 32 that defines the opening 30 in the bottle's top portion 20, and an annular shoulder 33 is located below the lip. The upper portion 22 of the rigid body 16 has a top edge 53 that defines an aperture 54 that is slightly larger than the cross-sectional area of the champagne bottle's top portion 20. The top edge 53 is curved inwardly such that the annular shoulder 33 on the champagne bottle 12 will engage the top edge, thereby preventing excessive axial movement within the rigid body 16. The rigid body 16 is shaped and sized such that when the champagne bottle 12 is positioned within the interior area 18, the top portion 20 of the champagne bottle extends upwardly above the top edge 53 of the rigid body 16. The bottle's lip 32 and opening 30 are positioned slightly above the rigid body's upper aperture 54 and the annular shoulder 33 is below the top edge. Accordingly, the lip 32 and opening 30 of the champagne bottle 12 are directly accessible when the top member 28 is removed from the rigid body 16, so the champagne 14 can easily be poured out of the champagne bottle without any interference from the rigid body.

In an alternate embodiment, not illustrated, the rigid body is a cylindrical housing and the cross-sectional area of the rigid body's upper aperture 54 is greater than the largest cross-sectional area of the champagne bottle, or other container within the rigid body, so the champagne bottle can be moved into and out of the rigid body 16 through the top aperture 54. A retaining device is attached to the rigid body 16 to engage the container and to hold the container within the rigid body when, for example, the apparatus 10 is tipped and the beverage is poured out of the container.

Figure 3:
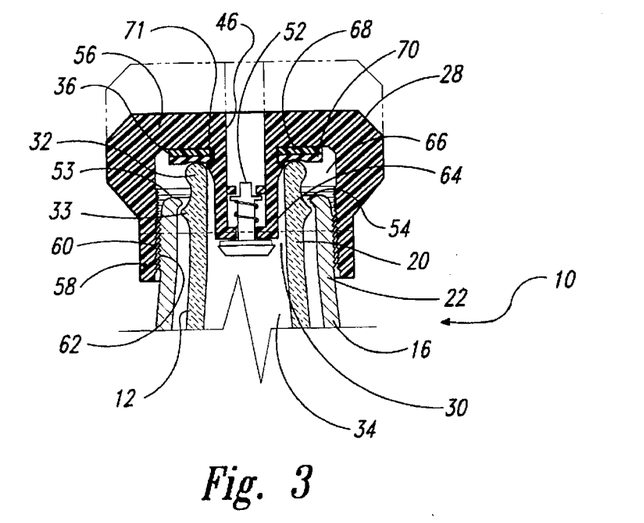
FIG. 3 is a fragmentary view of the apparatus of FIG. 2 showing a top member in a sealed position in solid lines, and in a raised, unsealed position in phantom lines.

As best seen in FIG. 3, the top member 28 removably attaches to the rigid body 16 and covers the top portion 20 of the champagne bottle 12. The top member 28 includes an axially symmetric, substantially cylindrical top section 56 and an alignment sleeve 58 that extends downwardly from the top section toward the rigid body 16. The alignment sleeve 58 has a plurality of internal threads 60 that engage external threads 62 on the upper portion 22 of the rigid body 16. The alignment sleeve 58 coaxially aligns the top member 28 with the rigid body 16. The top member 28 is securely retained on the upper portion 22 of the rigid body 16 by rotating the top member clockwise about its axis of rotation, thereby screwing the top member onto the rigid body. Conversely, the top member 28 is removed from the rigid body 16 by rotating the top member counter-clockwise and unscrewing it from the rigid body.

The top member 28 also includes an alignment guide 64 that is coaxially aligned with the alignment sleeve 58 and surrounded by the alignment sleeve. The alignment guide 64 has a cross-sectional area that is slightly smaller than the cross-sectional area of the opening 30 in the champagne bottle 12. The alignment guide 64 extends through the bottle's opening 30 and aligns the top portion 20 of the champagne bottle 12 with the top member's axis of rotation. Accordingly, the top member 28, the rigid body 16 and the top portion 20 of the champagne bottle 12 are all substantially coaxially aligned when the top member is screwed onto the upper portion 22 of the rigid body 16.

The alignment sleeve 58 and the alignment guide 64 are positioned apart from each other, and they define an annular channel 66 therebetween that receives the lip 32 of the champagne bottle 12. The top member 28 includes a seal 36 that is positioned around the alignment guide 64 within the annular channel 66. The seal 36 sealably engages the lip 32 of the champagne bottle 12 and forms a gas-tight seal between the top member 28 and the champagne bottle when the top member is screwed onto the rigid body 16 and tightened to a sealed position, as shown in solid lines in FIG. 3. In the sealed position, the gas-tight seal blocks pressurized carbon dioxide gas from exiting the champagne bottle 12, thereby trapping the pressurized carbon dioxide gas within the head space 34 and keeping the champagne bottle and the champagne pressurized. The seal 36 is constructed so the resulting gas-tight seal will contain the carbon dioxide gas within the champagne bottle at pressures of about 90 psi.

The alignment sleeve 58 and the alignment guide 64 center the top portion 20 of the champagne bottle 12 with the longitudinal axis of the top member 28 in order to ensure the gas-tight seal is formed between the lip 32 and the seal 36. If the champagne bottle 12 is misaligned within the rigid body 16, the gas-tight seal will not be properly formed, such that the pressurized carbon dioxide gas will not remain in the champagne bottle and the desired pressure within the head space 34 will not be achieved. Thus, the top member 28 provides a safety feature that will not allow the champagne bottle to be pressurized if it is not properly aligned and a proper gas-tight seal is not formed.

The seal 36 of the illustrated embodiment is constructed of a plastic washer 68 and a silicone washer 70, with the plastic washer being positioned in the uppermost portion of the annular channel 66 against the top section 56. The silicone washer 70 is attached to the bottom side of the plastic washer 68, and the silicone washer snugly engages the lip 32 of the champagne bottle 12 when the top member 28 is in the sealed position. The plastic and silicone washers 68 and 70 are rotatably attached to the alignment guide 64 by an annular shoulder 71 on the alignment guide. Accordingly, the plastic and silicone washers 68 and 70 are rotatable within the annular channel 66 relative to the top section 56. In the preferred embodiment, the plastic washer 68 is constructed of the same plastic material as the top section 56 of the top member 28, and the plastic washer has a relatively low coefficient of friction so it will slide against the top section 56. The silicone washer 70 has a higher coefficient of friction than the plastic washer 68, such that when the silicone washer 70 engages the lip 32 of the champagne bottle 12, the seal 36 remains stationary relative to the lip, and the remainder of the top member 28 rotates relative to the lip and seal. Thus, the top section 56 slides against the plastic washer 70 as the top member 28 is screwed onto the rigid body 16.

The top member 28 adjustably fits over the top of the champagne bottle, and the adjustability is achieved by the internal threads 60 that are positioned adjacent to the bottom edge of the alignment sleeve 58. The seal 36 is movable up or down relative to the top edge 53 of the rigid body 16 by screwing the top member 28 onto or off of the rigid body, respectively. The internal threads 60 extend upwardly from the bottom end of the alignment sleeve 58 a sufficient distance such that the top member 28 can be screwed downwardly relative to the rigid body 16 to form the gas-tight seal. Accordingly, the top member 28 is adjustable in the vertical direction, resulting in a vertical height adjustment to adapt to bottles having different heights. Thus, the position of the top member 28 can be adjusted relative to the rigid body 16 to ensure that a proper gas-tight seal is achieved around the opening 30 of the champagne bottle 12. Although the preferred embodiment utilizes a plurality of internal and external threads 60 and 62 to achieve the adjustability of the top member 28, other means of connecting the top member 28 to the rigid body 16 can be used.

The aperture 46 in the top member 28 extends through both the top section 56 and the alignment guide 64 and, thus, provides a passageway directly into the champagne bottle's head space 34. A one-way valve 52 is securely retained within the aperture. The valve 52 allows the pressurized carbon dioxide gas to flow into the head space 34 through the bottle's opening 30 when the valve is open and the top member 28 is in the sealed position. The valve 52 prevents the pressurized carbon dioxide gas from exiting the bottle 12 through the top member 28 when the valve is closed. The valve is biased to the closed position to prevent the carbon dioxide gas from inadvertently escaping from the champagne bottle.

The valve 52 is recessed within the aperture 46 such that it does not add to the overall height of the apparatus. The recessed position of the valve 52 minimizes the amount of storage space needed for the apparatus 10, which is important in, for example, a restaurant setting or the like where space behind a bar or in a refrigerator is limited. The recessed valve 52 is positioned low enough within the aperture 46 so the top portion of the aperture aligns the dispensing end 40 of the dispenser 42 with the valve when the champagne bottle 12 is being pressurized, as shown in phantom lines in FIG. 1. Although the illustrated embodiment has the recessed one-way valve 52, a two-way valve could be used, and the valve could also extend above the top section 56.

When the pressurized carbon dioxide gas is forced through the top member 28 and into the champagne bottle 12, the rigid body 16 remains at approximately atmospheric pressure and only the champagne bottle is pressurized. The pressure is released from the champagne bottle 12 by unscrewing the top member 28 and moving it from the sealed position to an unsealed position, as shown in phantom lines in FIG. 3. In the unsealed position the silicone washer 70 is above the bottle's lip 32 and the gas-tight seal is terminated. As the top member 28 moves toward the unsealed position, the pressurized carbon dioxide gas within the head space 34 exits the champagne bottle through the opening 30, and the annular channel 66 and the alignment sleeve 58 direct the escaping gas downwardly into the interior area 18 of the rigid body 16. As best seen in FIG. 2, the rigid body 16 includes a pressure release area 78 that directs the pressurized carbon dioxide gas out of the interior area 18 to ambient air. The pressure release area 78 is constructed so the carbon dioxide gas will quickly exit the interior area 18 and the interior area remains substantially at atmospheric pressure. Thus, the user can easily unscrew the top member 28 from the rigid body 16 without excess pressure inhibiting its removal.

In an alternate embodiment not illustrated, the top member 28 has a passageway that allows air within the head space 34 to be purged from the champagne bottle 12 before fully pressurizing the bottle with the high-pressure carbon dioxide. This purging process further preserves the champagne by removing oxygen gas from the head space, so the oxidization of the champagne is minimized.

Figure 4:
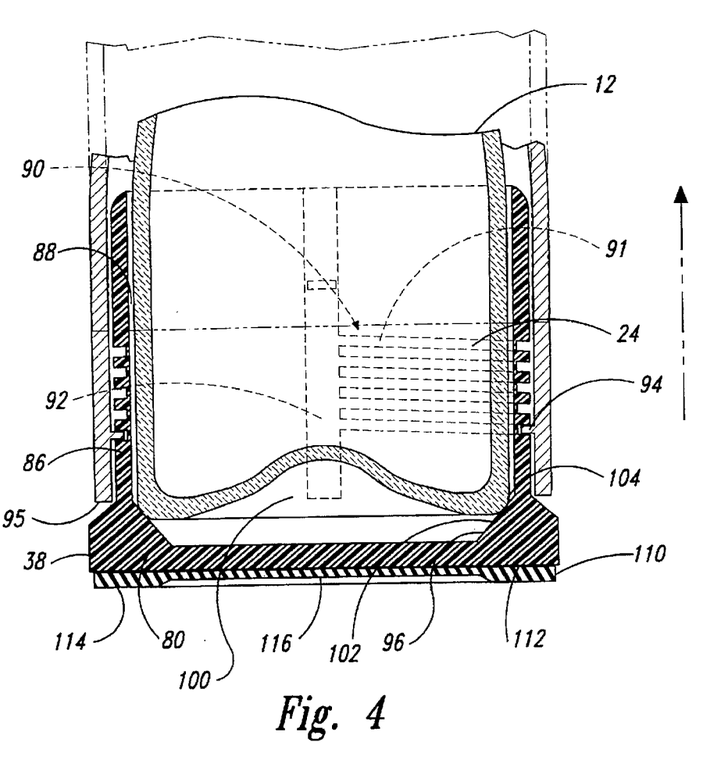
FIG. 4 is a fragmentary view of the apparatus of FIG. 2 showing a bottom member in a locked position in solid lines, and in an unlocked and partially removed position in phantom lines.

As best seen in FIGS. 2 and 4, the bottom member 38 is attached to the lower portion 26 of the rigid body 16 and supports the bottom of the champagne bottle 12 within the interior area 18. The bottom member 38 is positioned at a distance below the top member 28 so the lip 32 of the champagne bottle 12 is pressed firmly against the seal 36 when the top member is in the sealed position. The bottom member 38 includes an axially symmetric, generally cylindrical bottom section 80 and outer sidewalls 86 that extend upwardly from the bottom section and define a receiving area 88 that receives and supports the bottom portion 24 of the champagne bottle 12. The bottom member 38 is preferably an injection-molded plastic unit that is shaped and sized to receive a champagne bottle 12 having up to a 4-inch outer diameter at its bottom portion 24.

As best seen in FIG. 4, the sidewalls 86 are positioned interior of the rigid body's lower portion 26. The rigid body's lower portion 26 has two partial threads 94 that extend radially inward. The partial threads 94 are opposite each other and are at the same height relative to the bottom edge 95 of the rigid body 16. The sidewalls 86 have two sets of interrupted threads 90 that are opposite each other and that threadably engage a respective one of the rigid body's partial threads 94 to securely and removably connect the bottom member 38 to the rigid body 12. Each set of interrupted threads 90 has a plurality of sloped grooves 91 that are attached at a one end to a vertically aligned channel 92. Each of the vertically aligned channels 92 slidably receive a respective one of the partial threads 94, as is shown in phantom lines in FIG. 4, such that the vertical position of the bottom member 38 relative to the rigid body 16 can be adjusted up or down, as necessary, to accommodate the champagne bottle 12 within the rigid body.

The bottom member 38 is movable between a locked position, shown in solid lines in FIG. 4, with the partial threads 94 located within the sloped grooves 91, and an unlocked position, shown in phantom lines in FIG. 4, with the partial threads located in the vertical channels 92. The grooves 91 slidably receive the partial threads 94 when the rigid body 16 is rotated relative to the bottom member 38, whereby the partial threads move out of the channel 92 and into the grooves. As shown in the illustrated embodiment, the connection between the bottom member 38 permits a fast and simple twist break between the rigid body 16 and the bottom member by rotating the bottom member approximately one-quarter revolution between the unlocked and locked positions. Although the preferred embodiment is configured for a quarter turn twist break, other twist break configurations could be used, including a ½ turn, ⅛ turn, or a 1/16 turn twist break arrangement.

The sloped grooves 91 are sloped downwardly from the channel 92 with a one-thread pitch such that the bottom section 80 of the bottom member 38 is pulled toward the top member 28 as the bottom member is rotated toward the locked position. In the locked position, the bottom member 38 pushes against the champagne bottle and pushes the lip 32 securely against the seal 36 to form the gas-tight seal. Accordingly, the interrupted threads 90 provide for gross vertical adjustment of the bottom member 38 relative to the rigid body 16 to properly position the champagne bottle 12 within the interior area 18 so a proper gas-tight seal is formed when the top and bottom members 28 and 38 are in the sealed and locked positions, respectively. When the bottom member 38 is in the unlocked position, the rigid body 16 is separable from the bottom member to expose the champagne bottle 12 by lifting the rigid body 16 upwardly away from the bottom member and away from the champagne bottle, as shown in phantom lines in FIG. 4.

Accordingly, when the apparatus 10 is used in, for example, a restaurant setting, the bottom member 38 may be turned one quarter turn and quickly removed from the rigid body 16, thereby providing direct access to the entire champagne bottle 12. In the illustrated embodiment, the vertical channels 92 communicate with ambient air outside the apparatus 10, such that the vertical channels form pressure release channels that allow the pressurized carbon dioxide gas to flow from the interior area 18 out to ambient air after the bottom member 38 is moved toward the unlocked position or after the top member 28 is moved toward the unsealed position as discussed above. The champagne bottle 12 can then be removed from the apparatus for presentation to a customer. Thereafter, the champagne bottle 12 is returned to the bottom member 38, and the rigid body 16 is placed over the champagne bottle and over the bottom member. The bottom member is then moved from the unlocked position to the locked position, and the champagne bottle 12 and the champagne are enclosed in the apparatus 10.

As best seen in FIG. 4, the bottom section 80 of the bottom member 38 has a bottom alignment guide 102 that coaxially aligns the bottom portion 24 of the champagne bottle 12 with the bottom member 38 and with the top member 28. The bottom alignment guide 102 includes sloped surfaces 96 that slope downwardly from the outer sidewalls 86 toward the axis of rotation of the bottom member. The sloped surfaces 96 form an annular concave area that receives the bottom of the champagne bottle 12 and automatically aligns the bottom portion 24 of the champagne bottle 12 within the interior area 18 regardless of whether the bottom of the champagne bottle is flat or has a punt 100 formed therein, as shown in FIG. 4, and regardless of the width of the bottle. The bottom alignment guide 102 facilitates in ensuring that the lip 32 of the champagne bottle 12 (FIG. 3) is properly aligned to form the gas-tight seal. Thus, the apparatus 10 provides an inherent safety feature, wherein the champagne bottle 12 cannot be repressurized unless it is properly installed and aligned within the apparatus.

The bottom alignment guide 102 also provides a partial height adjustment of the champagne bottle 12 within the interior area 18. For a given volume, shorter champagne bottles 12 typically have a greater bottom diameter than taller champagne bottles. The bottom corners 104 of a wide, short bottle will engage the sloped surfaces 96 at a higher position along the sloped surfaces 96 so the bottle rides up higher on the bottom alignment guide 102. Conversely, a narrow, tall champagne bottle rides lower on the bottom alignment guide 102. Accordingly, the height difference between wide, short bottles and narrower, taller bottles is substantially compensated by the bottom of the apparatus 10 in the concave bottom alignment guide 102, so the top portions of short and tall champagne bottles will be at approximately the same position relative to the rigid body 16 when installed in the apparatus. Thus, the range of adjustment that needs to be built in to the apparatus 10 to accommodate different sized sparkling wine bottles is minimized.

As best seen in FIGS. 2 and 4, the apparatus 10 of the illustrated embodiment also includes a resilient bottom layer 110 attached to the lower exterior surface 112 of the bottom member. The bottom layer 110 of the preferred embodiment is a thermoplastic material that has a coefficient of friction that is higher than the coefficient of friction of the bottom member 38, so the apparatus 10 resists sliding along the supporting surface, such as a table, a bar, or the like. The bottom layer 110 has an annular outer portion 114 that extends away from the exterior surface 112 and defines a recessed inner portion 116. When the apparatus 10 is set onto a bar, the recessed inner portion 116 does not engage the bar and the entire weight of the apparatus is distributed over the annular outer portion 114. As a result, all of the frictional resistance between the bottom layer 110 and the bar is located at the annular outer portion 14. The frictional resistance located thusly creates a torque to resist rotation of the bottom member 38 when the user rotates the rigid body 16 to open or close the apparatus. Thus, the annular outer portion 114 of the bottom layer 110 facilitates quick and efficient opening and closing of the apparatus 10 so the user can quickly remove or insert the champagne bottle 12 in the apparatus.

Accordingly, the apparatus 10 of the illustrated embodiment described above preserves and recarbonates the champagne by placing the previously opened champagne bottle 12 within the interior area 18, shown in FIG. 2, through the lower portion of the rigid body 16, and moving the top and bottom end members 28 and 38 to the sealed and locked positions, respectively. As a result, the champagne bottle 12 is coaxially aligned with the rigid body 16 and with the top and bottom members 28 and 38. The dispensing end 40 of the dispenser 42, shown in FIG. 1, is inserted into the aperture 46 and pressurized carbon dioxide gas is passed into the head space 34 through the aperture 46 and valve 52 until the pressure within the head space is approximately 90 psi. The dispensing end 40 is then removed and the pressurized carbon dioxide gas within the head space dissolves into the champagne until equilibrium is reached. The pressurized champagne bottle 12 is completely contained within a non-defeatable safety enclosure that will contain the champagne bottle even if it explodes within the interior area 18.

The apparatus 10 is described above as preserving and recarbonating the champagne in the previously opened champagne bottle. However, the apparatus 10 can also carbonate a previously non-carbonated beverage. For example, a still wine can be carbonated within the apparatus 10 by pressurizing the bottle with the carbon dioxide gas to a selected elevated level that will cause carbon dioxide gas to dissolve into the previously uncarbonated still wine.

The preserved and repressurized champagne 14 can be served from the champagne bottle 12 while the bottle is within the rigid body 16 by unscrewing the top member 28 from the rigid body 16, thereby allowing the pressurized carbon dioxide to exit the head space 34, and lifting the top member off of the rigid body. Removing the top member 28 exposes the top portion 20 of the champagne bottle 12, and the champagne 14 is then poured out of the champagne bottle 12 through the opening 30 into a glass, or the like.

The champagne 14 can also be served from the champagne bottle 12 by removing the champagne bottle from the rigid body 16 by rotating the bottom member 38 to the unlocked position relative to the rigid body 16, lifting the rigid body upwardly off of the bottom member to uncover the champagne bottle, and removing the champagne bottle from the bottom member. Thereafter, the champagne bottle 12 can be presented to a customer and the champagne poured. The bottle is then placed back into the rigid body 16, the bottom member 38 inserted and moved to the locked position, and the head space 34 repressurized with the carbon dioxide gas to approximately 90 psi as discussed above. Accordingly, the apparatus 10 of the present invention provides a double action, whereby the carbonated beverage can be poured either by removing the top member or by removing the container from the enclosure via the quick release twist break.

Numerous modifications and variations of the method and apparatus for preserving and recarbonating beverages disclosed herein will occur to those skilled in the an in view of this disclosure. For example, the bottom member may be integrally connected to the rigid body 16, and the rigid body may be a two-piece member having upper and lower halves that are separable by twisting one half relative to the other half. Therefore, it is to be understood that these modifications and variations and equivalents thereof may be practiced while remaining within the spirit and the scope of the invention as defined in the following claims.

I claim:

1. A safety enclosure and carbonation apparatus for containing and pressurizing with pressurized carbon dioxide gas from a gas source a container having a beverage therein and having an opening, comprising:

a rigid body having sidewalls that define an interior cavity that removably receives and contains the container therein, said rigid body having upper and lower portions that define top and bottom portions of said interior cavity;

a top member connected to said upper portion of said rigid body and covering said top portion of said interior cavity, said top member having an aperture therein and a seal around said aperture, said aperture being positioned to communicate with the opening of the container, an inner portion of said top member being shaped to extend into the opening of the container and terminate at a position substantially adjacent to the opening of the container so said top member extending into the opening is out of engagement with the beverage, said aperture extending through said inner portion of said top member, and said seal being positioned to sealably engage the container around the opening to form a gas-tight seal therebetween;

a valve attached to said top member and positioned to communicate with said aperture, said valve being connectable to the gas source to allow the pressurized carbon dioxide gas to pass through said aperture into the container at the opening to pressurize the container and the beverage;

a bottom member attached to said lower portion of said rigid body and covering said bottom portion of said interior cavity, said rigid body, said bottom member, and said top member being interconnected to enclose the container within the interior cavity, thereby providing a safety enclosure around the container when the container is pressurized with the carbon dioxide gas; and a pressure relief device that communicates with said interior cavity, said pressure relief device being positioned to maintain a pressure within the interior cavity at atmospheric pressure when the container is in said interior cavity.

2. The safety enclosure and carbonation apparatus of claim 1 wherein said top member is removably attached to said rigid body.

3. The safety enclosure and carbonation apparatus of claim 1 wherein said bottom member is removably attached to said rigid body.

4. The safety enclosure and carbonation apparatus of claim 1 wherein said inner portion of said top member being an alignment guide that extends into the container through the opening, said seal being positioned around said alignment guide and said aperture extends through said alignment guide, said alignment guide positioning the opening of the container immediately adjacent to said seal.

5. The safety enclosure and carbonation apparatus of claim 4 wherein the container has a top portion with the opening in the top portion, and said top member includes an alignment sleeve that is coaxially aligned with said alignment guide and positioned around said alignment guide, said alignment sleeve being shaped to extend around the top portion of the container with said alignment guide extending through the opening and with said seal sealably engaging the top portion of the container around the opening.

6. The safety enclosure and carbonation apparatus of claim 4 wherein said valve is positioned within said aperture in said alignment guide.

7. The safety enclosure and carbonation apparatus of claim 4 wherein said bottom member includes an alignment portion that engages the container and aligns the container within said rigid body with the opening of the container being aligned with said aperture in said top member and said seal being aligned with the container around the opening of the container.

8. The safety enclosure and carbonation apparatus of claim 1 wherein the container is a bottle and said rigid body has a shape that corresponds to a shape of the bottle.

9. The safety enclosure and carbonation apparatus of claim 1 wherein said pressure relief device is integrally connected to said rigid body.

10. The safety enclosure and carbonation apparatus of claim 1 wherein the container has a top portion with the opening therein and with an annular shoulder extending radially outwardly from the top portion, and the upper portion of the rigid body has a retaining lip extending radially inwardly and being positioned to engage the annular shoulder of the container and prevent selected axial movement of the container away from the bottom member.

11. A safety enclosure and carbonation apparatus for containing and pressurizing with pressurized gas from a gas source a container having a beverage therein and having an opening, comprising:

a body having an interior cavity that removably receives and substantially contains the container therein, said body having upper and lower portions, said body including a pressure relief device that communicates with said interior cavity, said pressure relief device being constructed to maintain a pressure within said interior cavity at atmospheric pressure when the container is in the interior cavity;

a top portion connected to said upper portion of said body, said top portion having an aperture therein and a seal around said aperture, said aperture being positioned to communicate with the opening of the container, said top portion having an inner member being shaped to extend into the opening of the container and terminate at a position substantially adjacent to the opening of the container so said inner member is out of engagement with the beverage, said aperture extends through said inner member and said seal being positioned to sealably engage the container around the opening to form a gas-tight seal therebetween;

a valve attached to said top portion and positioned to communicate with said aperture, said valve being adapted to allow the pressurized gas to pass through said aperture into the container to pressurize the container and the beverage; and a bottom portion attached to said lower portion of said body, said body, said bottom portion, and said top portion being interconnected to enclose the container within the interior cavity, thereby providing a safety enclosure around the container when the container is pressurized with the gas.

12. The safety enclosure and carbonation apparatus of claim 11 wherein said bottom portion has a bottom alignment guide that communicates with said interior cavity, said bottom alignment guide being positioned to engage the container and to align the container within said rigid body with the opening of the container being aligned with said aperture in said top portion and said seal being aligned with the container around the opening.

13. The safety enclosure and carbonation apparatus of claim 12 wherein said bottom portion includes a bottom section having a center area and outer portions around the center area, and said alignment guide includes sloped sidewalls attached to said outer portions of said bottom section, said sloped sidewalls sloping downwardly from said outer portions toward said center portion to define a concave surface relative to said interior area of said body.

14. The safety enclosure and carbonation apparatus of claim 11 wherein said bottom portion is removably attached to said body.

15. The safety enclosure and carbonation apparatus of claim 11 wherein said bottom portion is a selected distance from said seal, and said bottom portion is movably attached to said body with said selected distance between said bottom portion and said seal being adjustable.

16. The safety enclosure and carbonation apparatus of claim 11 wherein said body has a shape that substantially corresponds to a shape of the container.

17. The safety enclosure and carbonation apparatus of claim 11 wherein said bottom portion has an exterior surface, and said apparatus further including a resilient bottom layer adhered to said exterior surface, said bottom layer having an annular outer portion that defines a recessed inner portion, said annular outer portion extending away from said exterior surface and being adapted to distribute the weight of the apparatus thereover.

18. The safety enclosure and carbonation apparatus of claim 11 wherein the container has a top portion with the opening therein and with an annular shoulder extending radially outwardly from the top portion, and the upper portion of the body has a retaining lip extending radially inwardly and being positioned to engage the annular shoulder of the container and prevent selected axial movement of the container away from the bottom member.

19. A safety enclosure and carbonation apparatus for pressurizing a container with pressurized carbon dioxide gas from a gas source, comprising:

a container having top and bottom portions, said top portion having an opening therein, and said container having a beverage therein;

a rigid body having sidewalls defining an interior cavity, said container being removably positioned within said interior cavity and contained within said rigid body, said rigid body having upper and lower portions, said upper portion being adjacent to said top portion of said container, said rigid body having a longitudinal axis and having a pressure release device that communicates with said interior cavity, said pressure release device being constructed to maintain a pressure within said interior cavity at atmospheric pressure when said container is in said interior cavity;

a top member releasably connected to said upper portion of said rigid body, said top member having an alignment guide to align said top portion of said container relative to said top member, said alignment guide having an aperture therein that extends through said top member and terminates substantially adjacent to the opening of the container, said top member being out of engagement with the beverage, said top member having a seal around said alignment guide that is positioned to engage said top portion of said container around said opening, said top member being movable relative to said container between a sealed position and a removed position, when said top member is in said sealed position said alignment guide extends into said container through said opening and said aperture communicates with said opening of said container and said seal sealably engages said top portion of said container around said opening to form a gas-tight seal, when said top member is in said unsealed position carbon dioxide gas is allowed to pass between said seal and said top portion around said opening;

a valve attached to said top member and positioned to communicate with said aperture, said valve being connectable to the gas source and positioned to allow the pressurized carbon dioxide gas to pass into said container directly through said aperture and through said opening to pressurize said container at a selected pressure, and said valve blocking said pressurized carbon dioxide gas from exiting said container when said top member is in said sealed position;

a bottom member attached to said lower portion of said rigid body and supporting said bottom portion of said container, said rigid body, said top member, and said bottom member being interconnected to enclose the container within the interior cavity, thereby providing a safety enclosure around said container when said container is pressurized with the carbon dioxide gas.

20. The apparatus and container of claim 19 wherein said top member is removably attached to said upper portion of said rigid body whereby said beverage may be poured out of said container through said opening when said top member is removed from said upper portion of said rigid body.

21. The apparatus and container of claim 19 wherein said bottom member includes an alignment guide that engages said bottom portion of said container and aligns said container within said rigid body with said top portion of said container being aligned with said seal and said aperture.

22. The apparatus and container of claim 19 wherein said top member includes an alignment sleeve around said alignment guide and coaxially aligned with said alignment guide, said alignment sleeve being positioned to align said top portion of said container with said seal, and said alignment sleeve extending around said top portion of said container when said top member is in said sealed position.

23. The apparatus and container of claim 19 wherein said valve is positioned within said aperture in said alignment guide.

24. The apparatus and container of claim 19 wherein said bottom member is a selected distance from said seal, and said bottom member is movably attached to said rigid body with said selected distance between said bottom member and said seal being adjustable.

25. The apparatus and container of claim 19 wherein said bottom member has an exterior surface, and said apparatus further including a resilient bottom layer adhered to said exterior surface, said bottom layer having an annular outer portion that defines a recessed inner portion, said annular outer portion extending away from said exterior surface and being adapted to distribute the weight of the apparatus thereover.

26. A method of preserving and re-carbonating a carbonated beverage contained in a previously opened container having a top portion with an opening therein and a bottom portion, comprising the steps of:

placing the previously opened container that is partially filled with the carbonated beverage in a rigid safety enclosure having an upper portion with a first aperture therein, the top portion of the container being adjacent to the first aperture;

securing a top member onto the upper portion of the rigid safety enclosure over the first aperture with the top member being out of engagement with the beverage, the top member having a second aperture therein that communicates with the opening of the container and the top member having a seal around the second aperture that sealably engages the top portion of the container around the opening and forms a gas-tight seal therebetween, the second aperture having a valve therein; and adding pressurized carbon dioxide gas into the container through the valve and above the beverage until the container is pressurized to a selected elevated pressure above atmospheric pressure with said rigid body being at atmospheric pressure, the pressurized carbon dioxide gas being contained within the container so as to interact with the beverage to preserve and re-carbonate the beverage.

27. The method of claim 26 wherein the step of adding pressurized carbon dioxide gas into the container includes adding the pressurized carbon dioxide gas until gas pressure within the container is approximately 90 psi.

28. The method of claim 26, further comprising the steps of:

releasing the pressurized carbon dioxide gas from within the container;

removing the top member from the rigid body so the opening of the container is exposed through the first aperture;

pouring a selected amount of the carbonated beverage out of the container;

replacing the top member onto the rigid body after the selected amount of carbonated beverage has been poured; and re-pressurizing the container with pressurized carbon dioxide gas.

29. The method of claim 28 wherein the step of pouring includes pouring the selected amount of the carbonated beverage out of the container when the container is contained within the rigid body.

30. The method of claim 28 further comprising the steps of removing the container from the rigid body before pouring the selected amount of the carbonated beverage out of the container, and replacing the container within the rigid body after the carbonated beverage is poured.

31. The method of claim 26 wherein the rigid safety enclosure has an adjustable bottom member that supports the previously opened container within the rigid safety enclosure, the bottom member being at a first position relative to said upper portion of said rigid safety enclosure, and further including the step of moving the bottom member relative to the rigid safety enclosure from the first position to a second position.

* * * * *